United States Patent
Fan et al.

(10) Patent No.: US 6,689,854 B2
(45) Date of Patent: Feb. 10, 2004

(54) WATER AND OIL REPELLENT MASONRY TREATMENTS

(75) Inventors: Wayne W. Fan, Cottage Grove, MN (US); Steven J. Martin, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

(21) Appl. No.: 09/938,188

(22) Filed: Aug. 23, 2001

(65) Prior Publication Data

US 2003/0083448 A1 May 1, 2003

(51) Int. Cl.$^7$ ................................................ C08F 14/18
(52) U.S. Cl. ...................... 526/243; 524/544; 526/242; 526/463; 106/2
(58) Field of Search ................................ 524/544, 546; 526/242, 243; 556/463; 106/2

(56) References Cited

U.S. PATENT DOCUMENTS

| | | | |
|---|---|---|---|
| 4,517,375 A | | 5/1985 | Schmidt ...................... 556/463 |
| 4,557,837 A | | 12/1985 | Clark, III et al. ........ 252/8.55 C |
| 4,648,904 A | | 3/1987 | DePasquale et al. ............. 106/2 |
| 5,274,159 A | * | 12/1993 | Pellerite et al. ............... 556/485 |
| 5,616,645 A | * | 4/1997 | Kuwamura et al. .......... 524/546 |
| 5,990,212 A | * | 11/1999 | Hager et al. ................. 524/269 |
| 6,037,429 A | * | 3/2000 | Linert et al. ................. 526/243 |
| 6,103,001 A | * | 8/2000 | Fisher et al. ............ 106/287.14 |

FOREIGN PATENT DOCUMENTS

| | | |
|---|---|---|
| EP | 0 561 708 A2 | 9/1993 |
| FR | 2 639 353 A | 5/1990 |
| WO | WO 92/07886 | 5/1992 |

OTHER PUBLICATIONS

Guo–Qing Tang, SPE and Abbas Firoozabadi, SPE, SPE 62934, "*Relative Permeability Modification in Gas–Liquid Systems Through Wettability Alteration to Intermediate Gas–Wetting*", Reservoir Engineering Search Institute.

Kewen Li, SPE and Abbas Firoozabadi, SPE, "*Experimental Study of Wettability Alteration to Preferential Gas–Wetting in Porous Media and Its Effects*", Reservoir Engineering Research Institute, Apr. 2000, pp. 139–149.

* cited by examiner

Primary Examiner—David W. Wu
Assistant Examiner—Henry Hu
(74) Attorney, Agent, or Firm—Kent S. Kokko

(57) ABSTRACT

The present invention provides a water-soluble and shelf-stable aqueous fluorochemical polymeric treatment useful to treat porous substrates to render them repellent to water- and oil-based stains. The treatment comprises a water-soluble or dispersible fluorochemical polymer containing only carbon atoms in the backbone, with a plurality of each of the following groups pendant from the backbone: (a) fluoroaliphatic groups, (b) carboxyl-containing groups, (c) silyl groups and optionally (d) other non-hydrophilic groups. Because the water-soluble polymeric treatment, and the shelf-stable aqueous solutions thereof, can be applied to porous substrates in aqueous solution, they eliminate the need for environmentally harmful and toxic co-solvents.

18 Claims, No Drawings

WATER AND OIL REPELLENT MASONRY TREATMENTS

FIELD OF THE INVENTION

This invention relates to water-soluble, soil-resistant and water and oil repellent fluorochemical polymers. More particularly, the present invention relates to the treatment of masonry and other porous substrates with water-soluble fluorochemical polymers to render them resistant to soil and repellent to water-and oil-based stains.

BACKGROUND OF THE INVENTION

Masonry, a term used generically to describe building materials such as concrete, brick, tile, stone, grout, and like substances, is used extensively in the construction of buildings, roads, parking ramps, driveways, garage flooring, fireplaces, fireplace hearths, and counter tops. When left unprotected, masonry or asphalt surfaces quickly discolor from exposure to water-and oil-based stains and gradually deteriorate from spalling and efflorescence induced by water penetration and weather exposure. Common household liquids are among the most severely discoloring stains including motor oil, brake-oil, transmission fluid, cooking oil, coffee, and wine.

Masonry and other porous surfaces may be made resistant to water and water-based liquids in one of two ways: by rendering the surface waterproof or by rendering the surface water repellent. A waterproofed surface is completely impervious to both liquid water and water vapor. A water repellent surface repels water but is substantially permeable to water vapor. Mason Hayek, "Waterproofing and Water/Oil Repellency," 24 Kirk-Othmer Encyclopedia Of Chemical Technology 460-62 (3d ed. 19xx), for example, provides an overview of these effects.

Waterproofing of a surface is typically achieved by application of a membrane such as vinyl chloride, polyvinyl chloride, polyethylene, or butyl rubber or by application of a sealant such as tar, asphalt, paints, polyurethane, epoxy or mastics. While these waterproofing agents can offer excellent resistance to penetration by water and water-based liquids, they often disadvantageously alter the appearance of the coated surface, changing the color of the surface and leaving it with a shine. Waterproofing treatments also trap moisture within the treated surface, thereby promoting spalling.

In contrast, water repellents do not alter the appearance of a porous masonry surface when applied as a treatment, and because a water repellent surface is permeable to water vapor, moisture does not become trapped in the masonry and spalling effects can be reduced. Water-repellent treatments used commercially include metal stearates, oils, waxes, acrylates (both polymers and monomers), silicones (solvent-based and emulsion), siliconates, silanes and, more recently, fluorochemicals. These compositions generally contain hydrophobic groups, such as a long-chain alkyl group or polydimethylsiloxane, and functional groups, such as silyl or carboxyl, to bond either covalently or ionically to the masonry surface, which typically contains high concentrations of silicon, calcium and aluminum atoms. Treatments made from these compositions are typically delivered from volatile organic solvents, which are undesirable because of the adverse environmental and health effects associated with them.

Environmental concerns have spawned the development of a number of water-dispersed and water-emulsified masonry treatments. U.S. Pat. No. 4,648,904 (DePasquale et al.), for example, describes a shelf-stable aqueous emulsion useful to render a porous ceramic substrate water-repellent consisting essentially of a $C_1$–$C_{20}$ hydrocarbyl or halogenated hydrocarbyl silane and a nonionic emulsifying agent having a hydrophillic-lipophilic balance (HLB) value from 4 to 15. Also, U.S. Pat. No. 4,517,375 (Schmidt) discloses aqueous impregnation solutions prepared from hydrolyzed alkyl trialkoxy silanes. While providing ecological advantages over solvent-based treatments, these water-dispersed and water-emulsified silane materials have not been evidenced to provide performance comparable to solvent delivered materials. Additionally, silane compositions do not provide significant protection from oil-based stains.

Only fluorochemical-containing treatments offer significant repellency to oil-based stains. U.S. Pat. No. 5,274,159 (Pellerite et al.), for example, describes certain water-soluble or dispersible fluorocarbylalkoxysilane surfactants which may be cured onto a masonry surface. Additionally, Published World Patent Application WO 9207886 describes an aqueous dispersion of a gelled particulate fluororesin that can form a protective film having good weatherability and good stain-resistance. U.S. Pat. No. 6,037,429 (Linert et al.) describes a water-soluble and shelf-stable aqueous fluorochemical polymeric treatment useful to treat porous substrates to render them repellent to water-and oil-based stains. The treatment comprises a water-soluble fluorochemical polymer containing only carbon atoms in the backbone, with a plurality of each of the following groups pendent from the backbone: (a) fluoroaliphatic groups, (b) carboxyl-containing groups, (c) silyl groups and optionally (d) other non-hydrophilic pendant groups that do not otherwise deleteriously affect one or more of the oil- or water-repellency properties.

SUMMARY OF THE INVENTION

In one aspect, the present invention provides a water-soluble and shelf-stable aqueous fluorochemical polymeric treatment useful to treat porous substrates to render them repellent to water-and oil-based stains. The treatment comprises a water-soluble or water-dispersible fluorochemical polymer containing only carbon atoms in the backbone, with a plurality of each of the following groups pendent from the backbone: (a) fluoroaliphatic groups, (b) carboxyl-containing groups, and (c) silyl groups and optionally (d) other non-hydrophilic groups. Typically, the treatment polymers have interpolymerized units derived from one or more, and preferably a plurality, of each of the following monomers:

(a) monomer selected from the group consisting of acrylate, methacrylate, acrylamide, methacrylamide, thioacrylate or meththioacrylate compounds containing a $C_4$–$C_6$ fluoroaliphatic moiety that is linked to the residue of the compound through a divalent, organic linking group;

(b) monomer selected from the group consisting of acrylic acid, methacrylic acid, carboxyalkylacrylate and carboxyalkylmethacrylate compounds; and (c) monomer selected from the group consisting of acrylate, methacrylate, acrylamide, methacrylamide, thioacrylate or meththioacrylate compounds containing an alkoxysilane moiety linked to the residue of the monomer through a divalent organic group (d) optionally one or more other monomers having a non-hydrophilic groups and which do not otherwise deleteriously affect the repellency properties of the resulting coating.

Surprisingly, in view of the teachings of U.S. Pat. No. 6,037,429 (Linert et al.), the above-described copolymer having a short-chain fluoroaliphatic moiety is water soluble or water-dispersible despite the absence of the highly water-solubilizing oxyalkylene or polyoxyalkylene groups.

Further, the present coating compositions are surprising effective in providing low surface energy coatings for use in applications such as masonry and other porous substrates to render them resistant to soil and repellent to water- and oil-based stains The compositions of the invention, comprising fluoroaliphatic groups having less than six carbon atoms, are believed to ultimately degrade to the fluoroaliphatic carboxylic acids (or salts thereof), which are believed to be more effectively eliminated that the higher homologous perfluorooctyl-containing compounds.

The performance of the coating prepared from the present coating compositions are surprising in view of teachings that the lower perfluoroalkyl groups were significantly less effective than longer chain perfluoroalkyl groups, such as the perfluorooctyl group. For example, it has been demonstrated that surfactants derived from perfluorocarboxylic acids and perfluorosulfonic acids exhibit considerable differences in performance as a function of chain length. See, for example *Organofluorine Chemicals and their Industrial Applications,* edited by R. E. Banks, Ellis Horwood Ltd. (1979), p56; J. O. Hendrichs, *Ind. Eng Chem,* 45, 1953, p103; M. K. Bemett and W. A. Zisman, *J. Phys. Chem.,* 63, 1959, p1912.

Further, various models have been devised to explain the low surface energies and contact angle data of fluorinated polymer coating that are based on a monolayer of a fluorinated carboxylic or sulfonic acids present at the air/liquid interface. The data suggest that only after the seven outermost carbon atoms of the fluoroalkyl group ($C_7F_{15-}$) were fully fluorinated did the contact angles (and therefore the surface energies) of various liquids on the surface approach those of a perfluorinated acid monolayer (see N. O. Brace, *J. Org. Chem.,* 27, 1962, p4491 and W. A. Zisman, *Advan. Chem* 1964, p22.). Therefore, one would expect that the performance of fluorinated coatings containing fluoroalkyl groups (e.g. coating made by polymerizing fluoroalkyl (meth)acrylates) could be predicted from the known performance of perfluorocarboxylic and perfluorosulfonic acid derivatives and the surface energy of the fluoropolymer coatings would be related to the chain length of the fluoroalkyl group of the fluoropolymer coating Surprisingly, it has been found that the coatings having fluoroaliphatic groups of six carbon atoms or less have surface energies and contact angle performance which are comparable to coating comprising fluoroaliphatic groups of the longer chain homologues, such as (meth)acrylates having perfluorooctyl groups.

The present coating compositions provide additional advantages. First, the shorter fluoroalkyl groups useful in the coating of the invention may be produced at a lower cost per weight because of higher yields while maintaining their potency as effective low surface energy coatings at the same weight basis. For example heptafluorobutyryl fluoride precursor may be prepared in yields of 60% as compared to perfluoro-octanoyl fluoride precursor (31%) in an electrochemical fluorination process (*Preparation, Properties, and Industrial Applications of Organofluorine Compounds,* edited by R. E. Banks, Ellis Horwood Ltd (1982), p26). Furthermore, the short chain carboxylic acids (the presumed intermediate degradation products) are less toxic and less bioaccumulative than the longer chain homologues.

In another aspect, the present invention provides shelf-stable aqueous solutions or dispersions comprising the polymeric treatment and a method of treating porous substrates to render them repellent to water-and oil-based stains using the aforementioned polymeric product.

Because the water-soluble polymeric treatment of the present invention, and the shelf-stable aqueous solutions thereof, can be applied to porous substrates in aqueous solution, they eliminate the need for environmentally harmful and toxic co-solvents. Particularly when applied to masonry and other siliceous materials, these polymeric treatments can react with the substrate onto which they are applied to form an invisible and water-insoluble coating that repels both water and oil, resists soiling, and that cannot be easily washed from the surface of the substrate. Substrates treated with these polymers are thereby durably protected from rain and normal weathering.

DETAILED DESCRIPTION OF INVENTION

The aqueous fluorochemical polymeric treatments useful in the invention comprise compounds that comprise water-soluble fluorochemical polymers containing only carbon atoms in the backbone, with a plurality of each of the following groups pendent from the backbone: (a) fluoroaliphatic groups, (b) carboxyl-containing groups, (c) silyl groups and optionally (d) other non-hydrophilic groups which do not otherwise deleteriously affect the repellency properties of the resulting coating.

Typically, useful treatment polymers comprise interpolymerized units derived from each of the following monomers:

(a) monomer selected from the group consisting of acrylate, methacrylate, acrylamide, methacrylamide, thioacrylate or meththioacrylate compounds which contain a fluoroaliphatic moiety that is linked to the residue of the compound through an organic, divalent linking group;

(b) monomer selected from the group consisting of acrylic acid, methacrylic acid, carboxyalkylacrylate and carboxyalkylmethacrylate compounds; and (c) monomer selected from the group consisting of acrylate, methacrylate, acrylamide, methacrylamide, thioacrylate and meththioacrylate compounds and containing an alkoxy- or hydroxysilane moiety linked to the residue of the monomer through a divalent organic group.

(d) optionally other monomers containing a non-hydrophilic group and that do not otherwise deleteriously affect the water-solubility and/or the water-and/or oil repellent properties of the product.

Preferably, a plurality of units derived from each of the aforementioned monomers is present in the polymer and the units can be located randomly or in blocks or segments along the backbone of the polymer In one embodiment, the polymeric composition comprises a polymer represented by the following general formula:

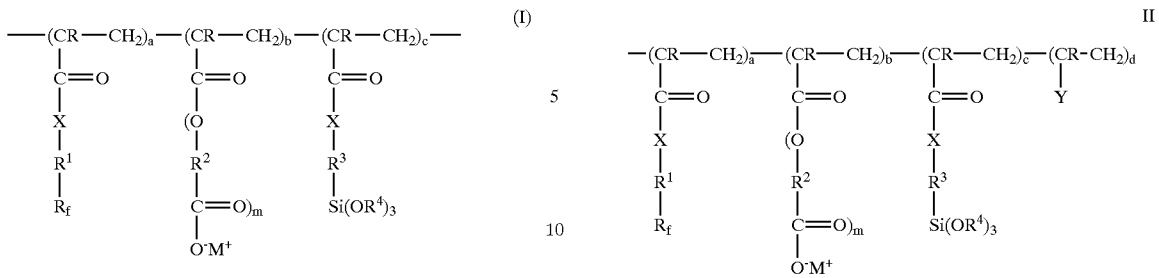

(I)

wherein:

R is hydrogen or an aliphatic hydrocarbon group having from 1 to 4 carbon atoms;

$R_f$ represents a fluoroaliphatic group having a perfluorinated carbon chain from about 3 to about 6 carbon atoms in length, more preferably having from about 4 to about 6 carbon atoms. $R_f$ can contain straight chain or branched chain. $R_f$ is preferably free of polymerizable olefinic unsaturation and can optionally contain caternary heteroatoms such as oxygen, divalent or hexavalent sulfur, or nitrogen, e.g. $CF_3$—O—$CF_2$—$CF_2$—. A fully fluorinated radical is preferred, but hydrogen or chlorine atoms may be present as substituents provided that not more than one atom of either is present for every two carbon atoms. It is preferred that $R_f$ contains about 60% to about 80% fluorine by weight. The terminal portion of the $R_f$ group is fully fluorinated, preferably containing at least 7 fluorine atoms, e.g., $CF_3CF_2CF_2$—, $(CF_3)_2CF$—, —$CF_2SF_5$ or the like. Perfluorinated aliphatic groups (i.e., those of the formula $C_nF_{2n+1}$—) are the most preferred embodiments of $R_f$, wherein n is 3 to 6 inclusive.

$R^1$ represents an organic divalent connecting group having from 1 to 12 carbon atoms and is preferably —$C_yH_{2y}$—, —$CON(R^5)C_yH_{2y}$—, —$SO_2N(R^5)C_yH_{2y}$—, or —$C_yH_{2y}SO_2N(R^5)C_yH_{2y}$—, —where $R^5$ is hydrogen, methyl, ethyl, propyl, and butyl and y is independently selected from 1 to 6, preferably from 2 to 4;

X is independently selected as oxygen, nitrogen, or sulfur. Preferably, X is oxygen or nitrogen, i.e. —O— or —NR—, where R is hydrogen or an aliphatic hydrocarbon group having from 1 to 4 carbon atoms;

$R^2$ is a short chain alkylene group, such as methylene or ethylene; m is either 0 or 1.

$M^+$ is $H^+$, $NH_4^+$, $NR_nH_{4-n}^+$, where each R is independently an alkyl, hydroxyalkyl, aryl or alkylaryl group and where n may be between 0 and 4 inclusive, or $M^+$ is an alkali metal cation, or is a multivalent cation that does not adversely affect the water solubility of the polymer, such as Ca and Zn.

$R^3$ represents an organic divalent connecting group having from 1 to 4 carbon atoms and is preferably —$CH_2$—, —$C_2H_4$—, —$C_3H_6$—or —$C_4H_8$—.

$R^4$ is selected from the group consisting of hydrogen, methyl, ethyl, propyl, and butyl.

Where the polymer contains "other monomers" the polymer may be represented by the following Formula (II):

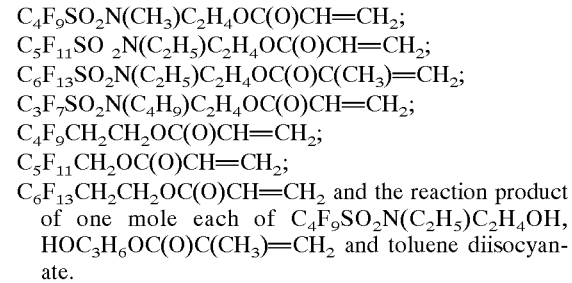

II

Wherein R, $R_f$, $R^1$, X, $R^2$, m, $M^+$, $R^3$ and $R^4$ are as previously defined, and Y is a non-hydrophilic group that does not deleteriously effect the oil- and/or water-repellency properties of the resulting coating.

The coefficients a, b, c, and d (if present) of Formulas I and II represent the number of interpolymerized monomer units for each monomer present in the polymer. The ratio of the constituent monomers in the polymer, reflected by the coefficients a, b, c and d should be chosen to meet the following polymer requirements:

(1) a polymer number average molecular weight ($M_n$) of from about 3500 to about 100,000, preferably from about 10,000 to about 75,000;

(2) a molecular weight distribution, $M_w/M_n$, of greater than 1.5 preferably greater than 2;

(3) from about 40% to about 80% by weight, preferably from about 50% to about 75% by weight, of interpolymerized monomer units with pendent fluoroaliphatic groups;

(4) from about 5% to about 50% by weight, preferably from about 5% to about 25% by weight, of interpolymerized monomer units with pendent carboxyl functional groups;

(5) From about 1% to about 20% by weight, preferably from about 2% to about 15% by weight, of interpolymerized monomer units with pendent silyl-containing functional groups, and (6) from about 0% to about 20% by weight, preferably from about 0% to about 5% by weight of "other monomers" having a non-hydrophilic group.

Representative fluoroaliphatic group-containing monomers useful for making the polymers depicted by Formula I include the following:

$C_4F_9SO_2N(CH_3)C_2H_4OC(O)CH=CH_2$;
$C_5F_{11}SO_2N(C_2H_5)C_2H_4OC(O)CH=CH_2$;
$C_6F_{13}SO_2N(C_2H_5)C_2H_4OC(O)C(CH_3)=CH_2$;
$C_3F_7SO_2N(C_4H_9)C_2H_4OC(O)CH=CH_2$;
$C_4F_9CH_2CH_2OC(O)CH=CH_2$;
$C_5F_{11}CH_2OC(O)CH=CH_2$;
$C_6F_{13}CH_2CH_2OC(O)CH=CH_2$ and the reaction product of one mole each of $C_4F_9SO_2N(C_2H_5)C_2H_4OH$, $HOC_3H_6OC(O)C(CH_3)=CH_2$ and toluene diisocyanate.

Representative carboxyl group-containing monomers useful for making the polymer depicted by Formula I include acrylic acid, methacrylic acid and carboxyethylacrylate.

Representative silyl group-containing monomers useful for making the polymer depicted in Formula I include 3-acryloxypropyl trimethoxysilane, 3-methacryloxypropyl trimethoxysilane, and vinyltriethoxysilane.

Representative "other monomers" (d) include (meth)acrylate esters and amides, such as ($C_1$–$C_{18}$) alkyl (meth)

acrylate esters and amides; vinyl ethers, such as ($C_1$–$C_{18}$) alkyl vinyl ethers; vinyl esters, such as such as ($C_1$–$C_{18}$) alkyl vinyl esters and styrenes. Such other others may be used in amounts of 0 to 20 wt. %, preferably 0 to 5 wt. %.

The polymerization reaction to create the polymeric treatments of this invention may be carried out in a solvent (e.g., acetone, ethyl acetate, isopropyl alcohol, tetrahydrofuran or methylene chloride) or in a solvent blend in the presence of little or no water using from 0.5 to 2.0 weight percent of a standard free radical polymerization initiator such as t-butylperoctanoate (TBPO) or 2,2-azobisisobutyronitrile based on the weight of the monomers employed. Optionally, 0.5 to 5 weight percent, preferably 0.75 to 1.5 weight percent, based on the weight of the monomers of a standard chain transfer agent such as 3-mercaptopropionic acid, n-octanethiol, 1,2-dihydroxy-3-mercaptopropane, isooctyithioglycolate (IOTG) or preferably a silane- or silanol-containing chain transfer agent such as 3-mercaptopropyltrimethoxysilane (MPTS) may also be used. The use of a chain transfer agent is not necessary in a solvent such as THF which itself provides chain transfer properties, but is necessary in a low free radical-containing solvent such as ethyl acetate to prevent the molecular weight from becoming excessively high and resulting polymers too viscous.

After the polymerization is complete, the acidic copolymer solution or dispersion is neutralized with water containing a base, preferably diethanol methyl amine, to form an emulsion or solution. The acidic copolymer is treated with sufficient base to neutralize from about 50 to 100%, preferably from about 60 to 80% of the carboxyl groups. The solvent or solvents used in the reaction may then be stripped under vacuum to form a clear aqueous solution or dispersion of the polymer without the need for external emulsifiers. During neutralization, any pendent silane groups may hydrolyze to form free silanol groups. These groups will not self-crosslink to destabilize the aqueous polymer solution but may instead increase the polymer's water solubility. Surprisingly, aqueous solutions of the resulting copolymers are shelf stable at room temperature, despite the absence of highly water-solubilizing or hydrophilic groups such as poly(ethylene oxide) groups. The presence of the silanol groups within the polymeric treatment additionally allows the polymer to covalently react with a siliceous masonry surface, thereby improving durability of the treatment.

Aqueous solutions or dispersions of the copolymers of the present invention may be applied onto any porous substrate into which a liquid may imbibe, including masonry, concrete, asphalt, textiles, carpets, plastics, painted surfaces, and leathers, to render that substrate resistant to soiling and repellent to water-and oil-based stains. Any method of application which produces a thin coating of the polymer on the substrate surface may be used, such as by spraying, padding, or painting. Once applied from solution, the polymer treatments may be dried or otherwise cured onto the substrate either under ambient conditions (i.e. cured at ambient temperatures) or at elevated temperatures to produce a long-lasting repellent surface that does not change the appearance of the substrate.

Application of a small amount of a multivalent hydroxide, e.g. calcium hydroxide, may also be added to a dilute aqueous solutions of the polymer prior to application of the treatment to a polished surface to facilitate the removal of excess coating from the surface. As a result of the penetration of the polymer treatments into the porous substrate surface, these treatments generally additionally prevent adsorption of staining fluids into the substrate (i.e., fluids will not soak in), even after extensive outdoor exposure, since the coating below the surface is not degraded.

The compositions of the present invention may also be used to improve the productivity of gas and oil wells by altering the wettability, or reducing the surface energy, of the porous well substrate. In gas wells, for example, the gas condensate reservoir often shows a sharp drop in productivity when the reservoir pressure drops below the dewpoint, or when liquid dropout accumulates around the wellbore. Efforts have been made to the enhance the productivity by injection of $CO_2$ or propane to remove the liquid around the wellbore, but the effect is temporary. However, with the composition of the present invention, the wettability of the wellbore region may be altered, and/or the surface energy of the wellbore substrate reduced, to enhance the gas and/or oil flow. Advantageously the compositions of the present invention are hydrolytically and thermally stable under wellbore conditions (from about 80–140° C.) and provide surface energy reduction even at high temperatures and pressures.

Therefore, the present invention provides a method for stimulating wells by contacting the porous well substrate with the composition of the present invention. The composition may be injected into the wellbore for a time and at a pressure sufficient to allow the composition to flow or otherwise diffuse into the porous substrate and reduce the surface energy of the porous substrate. The composition may then be recovered from the well be pumping or under pressure from the well. If desired, the composition may be used as a component of a fracturing fluid, which is injected into the wellbore under pressure sufficient to fracture the well substrate. The composition is generally used as an 0.01 to 10 wt. % aqueous composition. The aqueous composition may be a brine.

The following examples are offered to aid in a better understanding of the present invention and are not to be unnecessarily construed as limiting the scope thereof. All percentages cited are by weight unless otherwise specified.

EXAMPLES

TABLE 1

| Material | Structure | Availability/Preparation |
|---|---|---|
| Acetone | $CH_3C(O)CH_3$ | Sigma-Aldrich, Milwaukee, WI |
| Acrylic acid (AA) | $CH_2=CHCO_2H$ | Sigma-Aldrich, Milwaukee, WI |
| Methacrylic acid (MA) | $CH_2=C(CH_3)CO_2H$ | Sigma-Aldrich, Milwaukee, WI |
| Butyl Acrylate (BA) | | Sigma-Aldrich, Milwaukee, WI |
| Lauryl acrylate (LA) | | Sigma-Aldrich, Milwaukee, WI |
| n-octyl thiol | $n\text{-}C_8H_{17}SH$ | Sigma-Aldrich, Milwaukee, WI |
| 3-mercaptopropionic acid (MPA) | $HSCH_2CH_2CO_2H$ | Sigma-Aldrich, Milwaukee, WI |

TABLE 1-continued

| Material | Structure | Availability/Preparation |
|---|---|---|
| DEMA | $(HOCH_2CH_2)_2N(CH_3)$ | Sigma-Aldrich, Milwaukee, WI |
| FC-759 | | As described in U.S. Pat. No. 6,037,429 and C-6 |
| MeFBSE | $C_4F_9SO_2N(CHhd 3)CH_2CH_2OH$ | As described in Ex. 1, U.S. Pat. No. 2,803,656 |
| MeFBSEA | $C_4F_9SO_2N(CH_3)CH_2CH_2OCOCH=CH_2$ | |
| A-174 | $CH_2=C(CH_3)C(O)OCH_2CH_2CH_2Si(OCH_3)_3$ | Union Carbide |
| TBPO | $(CH_3)_3COOC(O)(CH_2)_6CH_3$ | Atofina Chemicals, Philadelphia, PA |
| HPA | $CH_2=CHC(O)OCH_2CH_2CH_2OH$ | Sigma-Aldrich, Milwaukee, WI |

Test Methods
Test Method I—Stain Test

Zanger Blue limestone tiles (available from Color Tile, Maplewood, Minn.; 30.5 cm by 30.5 cm by 1.0 cm thick) were divided into 6 sections (10.2 cm by 15.2 cm) and washed with water thoroughly and allowed to dry at room temperature overnight. A 3% aqueous solution of the chemical composition to be evaluated was coated onto the surface by wiping twice with a paper towel or brush saturated with the chemical composition. Each of the resulting treated tile sections was then allowed to dry at ambient laboratory temperature for at least 12 hours before testing. Slate and marble tile, concrete brick, and clear pine wood were similarly treated and tested.

A spot test was used to visually rate the ability of the treated tile sections to prevent a test fluid drop from staining the tile after a given exposure period. The following test fluids were used:

(1) Veryfine™ Grape juice fluid (GF)
(2) Pennzoil™ ATF Automatic transmission fluid (TF)
(3) Used 10W30 motor oil (MO)
(4) Paul Masson™ Burgundy wine (WIN)
(5) Water saturated with Taster's Choice™ coffee (COF)
(6) STP™ heavy duty brake fluid (BF)
(7) Mazola™ corn oil (CO)
(8) Soy Sauce (SS)
(9) Texaco™ Anti-freeze (AFC)
(10) Red dye in corn oil (dye)

A drop of each of the test fluids was place on each of the treated tile sections. After 7 hours, the drops were removed by wiping with a clean, dry, paper towel, and the tile was washed and scrubbed with Dawn™ liquid dishwashing soap (available from Procter & Gamble, Cincinnati, Ohio) mixed at 6 weight percent with tap water and rinsed with tap water. The visual appearance of the spot where each drop of test fluid had been place was rated on a scale of 0–5 as shown below. A rating of 0 represented the best stain-release performance of a chemical composition treatment of the tile surface.

0=no visible stain
1=trace of stain visible
2=outline of drop barely visible
3=outline of drop visible
4=dark outline of drop
5=dark stain which has spread Test Method II—Scrubbing Test to Measure Durability To determine the chemical composition treatment's durability, the following scrubbing test was used. A detergent solution was prepared consisting of 6% (w/w) Dawn™ liquid dishwashing soap in water. Each chemical composition treated limestone tile was contacted with the detergent solution. The resulting wet surface was scrubbed back and forth 10,000 times with a 12 cm by 3 cm stiff nylon bristle brush held lengthwise, using a Washability & Wear Tester from Paul N. Gardner Company, Inc., Pompano Beach, Fla. After rinsing with water, the tile was allowed to dry under ambient conditions for 24 hours before spot testing using Test Method I.

EXAMPLE 1

Preparation of MeFBSEA/AA/A-174 at the ratio of 75/22/3

A 30 mL narrow-mouth glass bottle was charged with MeFBSEA (7.5 g), acrylic acid (2.2 g), A-174 (0.3 g), TBPO (0.1 g), 3-mercaptopropionic acid (0.1 g) and acetone (20.0 g). The bottle was purged with nitrogen for approximately 2 minutes, sealed and then heated with agitation in a water bath at 65° C. for 5 hours. After that time, the resulting polymer solution was mixed with a solution of DEMA (2.91 g) in deionized water (39.0 g). The resulting neutralized polymer solution was distilled at a pressure of approximately 300 mm Hg (40 kPa) at 40–55° C. to remove acetone. A relatively clear aqueous concentrate of between 20–25% solids by weight. This concentrate was further diluted to 3% (wt) solids with deionized water, forming a clear, aqueous solution that was applied to tiles in Test Method I.

EXAMPLE 2–EXAMPLE 8

Example 2–Example 8 were prepared following the procedure of Example 1 with the exception that the ratios and weights of MeFBSEA/AA/A-174 were adjusted as shown in Table 2. For Example 2–example 8, the polymers were neutralized at 80%, which means that DEMA was charged at 80% of the molar ratio of acrylic acid (AA).

TABLE 2

| Example | Monomers | Monomer ratio | Monomer wts (g) |
|---|---|---|---|
| 2 | MeFBSEA/AA/A-174 | 65/32/3 | 6.5/3.2/0.3 |
| 3 | MeFBSEA/AA/A-174 | 70/27/3 | 7.0/2.7/0.3 |
| 4 | MeFBSEA/AA/A-174 | 60/37/3 | 6.0/3.7/0.3 |
| 5 | MeFBSEA/AA/A-174 | 80/17/3 | 8.0/1.7/0.3 |
| 6 | MeFBSEA/MA/A-174 | 65/32/3 | 6.5/3.2/0/3 |
| 7 | MeFBSEA/MA/A-174 | 70/27/3 | 7.0/2.7/0.3 |
| 8 | MeFBSEA/MA/A-174 | 75/22/3 | 7.5/2.2/0.3 |

EXAMPLE 9–19

Example 9–Example 19 were prepared following the procedure of Example 1 with the exception that the ratios of MeFBSEA/AA/A-174 and the DEMA deprotonation degree and weight were adjusted as shown in Table 3

TABLE 3

| Example | MeFBSEA/AA/A-174 ratio | MeFBSEA/AA/A-174 wts (g) | DEMA as % of AA (wts, g) |
|---|---|---|---|
| 9 | 75/22/3 | 37.5/11/1.5 | 60% (10.90) |
| 10 | 70/27/3 | 35/13.5/1.5 | 60% (13.4) |
| 11 | 65/32/3 | 32.5/16/1.5 | 60% (15.9) |
| 12 | 70/27/3 | 35/13.5/1.5 | 70% (15.6) |
| 13 | 70/27/3 | 35/13.5/1.5 | 50% (11.2) |
| 14 | 70/27/3 | 35/13.5/1.5 | 45% (10.1) |
| 15 | 70/27/3 | 35/13.5/1.5 | 90% (20.1) |
| 16 | 70/27/3 | 35/13.5/1.5 | 100% (22.4) |
| 17 | 75/22/3 | 37.5/11/1.5 | 70% (12.7) |
| 18 | 75/22/3 | 37.5/11/1.5 | 90% (16.4) |
| 19 | 75/22/3 | 37.5/11/1.5 | 100% (18.2) |

The low neutralization with DEMA (<60%) yielded a cloudy product in water, which later formed a precipitate.

EXAMPLES 20–26

Example 20 –Example 26 were prepared following the procedure of Example 1 with the exception that the ratios of MeFBSEA/AA/A-174 and the ratio and the type of chain transfer agent were adjusted as shown in Table 4. The DEMA neutralization was 70% in Example 20–Example 26.

TABLE 4

| Example | MeFBSEA/AA/A-174 ratio | MeFBSEA/AA/A-174 wts (g) | Chain transfer agent (wt % to monomers) |
|---|---|---|---|
| 20 | 70/27/3 | 35.0/13.5/1.5 | $HS(CH_2)_2CO_2H$ (0.5) |
| 21 | 70/27/3 | 35.0/13.5/1.5 | $HS(CH_2)_2CO_2H$ (0.75) |
| 22 | 70/27/3 | 35.0/13.5/1.5 | $HS(CH_2)_2CO_2H$ (1.5) |
| 23 | 80/17/3 | 16/3.4/0.6 | $HS(CH_2)_2CO_2H$ (0.75) |
| 24 | 75/22/3 | 15/4.4/0.6 | $HS(CH_2)_2CO_2H$ (0.5) |
| 26 | 70/27/3 | 35.0/13.5/1.5 | $n\text{-}C_8H_{17}SH$ (1.0) |

Example 27. Preparation of MeFBSEA/AA/BA/A-174 at the ration of 65/17/15/3 A 500 mL narrow-mouth glass bottle was charged with MeFBSEA (32.5 g), acrylic acid (8.5 g), butyl acrylate (7.5 g), A-174 (1.5 g), 3-mercaptopropionic acid (0.5 g) TBPO (0.5 g) and acetone (75 g). The bottle was purged with nitrogen for approximately 3 minutes, sealed and then heated with agitation in a water bath at 65° C. for 5 hours. After that time, the resulting polymer solution was mixed with a solution of DEMA (9.85 g) in deionized water (200 g). The resulting neutralized polymer solution was distilled at a pressure of approximately 300 mm Hg (40 kPa) at 40 –55° C. to remove acetone. A relatively clear aqueous concentrate of between 20–25% solids by weight. This concentrate was further diluted to 3% (wt) solids with deionized water, forming a clear, aqueous solution which was applied to tiles as in Test Method I.

EXAMPLE 28 –EXAMPLE 32

Example 28 –Example 32 were prepared following the procedure of Example 27 with the exception that different alkyl acrylates were used and the ratios and weights of MeFBSEA/AA/alkyl acrylate/A-174 were adjusted as shown in Table 5.

TABLE 5

| Example | Monomers | Monomer ratio | Monomer wts (g) |
|---|---|---|---|
| 28 | MeFBSEA/MA/BA/A-174 | 65/17/15/3 | 32.1/8.5/7.5/1.5 |
| 29 | MeFBSEA/AA/BA/A-174 | 60/22/15/3 | 30/11/7.5/1.5 |
| 30 | MeFBSEA/MA/BA/A-174 | 60/22/15/3 | 30/11/7.5/1.5 |
| 31 | MeFBSEA/AA/LA/A-174 | 70/20/7/3 | 35.0/10.0/3.5/1/5 |
| 32 | MeFBSEA/AA/LA/A-174 | 65/15/15/3 | 32.5/7.5/7.5/1.5 |

Comparative Example

EXAMPLES C1–C3

Example C1 used untreated tile. Example C2 used tile treated with TileLab™ Grout and Tile Sealer (available from Custom Building Products, Seal Beach, Calif.) and Example C3 used tile treated with 511 Porous Plus (available from Miracle Sealant Company of Irwindale, Calif.).

EXAMPLE C4

Preparations of MeFBSEA/AA/A-174/HPA at a ratio of 70/15/3/12

A 4-ounce narrow-mouth bottle was charged with 7.0 g of MeFBSEA, 1.5 g of AA, 0.3 g of A-174, 1.2 g of HPA, 0.1 g of TBPO initiator, 0.1 g of 3-mercaptoproppionic acid and 20 g of acetone. The bottle was purged with nitrogen for approximately 2 minutes, was sealed and then was heated with agitation in a water bath at 65° C. for 5 hours. After that time, the resulting polymer solution was mixed with 2.91 g DEMA in 39 g deionized water. The neutralized polymer solution was distilled at a pressure of approximately 300 mm Hg (40 kPa) at 40–55° C. to remove acetone. A relatively clear aqueous concentrate of between 20–25% solids by weight. This concentrate was diluted to 3% (wt) solids with deionized water to form a clear, aqueous solution that was applied to tiles as in Test Method I.

EXAMPLE C5 & EXAMPLE C6:

Example C5 & Example C6 were prepared following the procedures of Example C4 with the exception that the MeFBSEA/AA/A-174/HPA ratios were adjusted as shown in Table 6.

TABLE 6

| Example | Monomers | Wt % of monomers | Grams |
|---|---|---|---|
| C4 | MeFBSEA/AA/A-174/HPA | 70/15/3/12 | 7.0/1.5/0.3/1.2 |
| C5 | MeFBSEA/AA/A-174/HPA | 70/10/3/17 | 7.0/1.0/0.3/1.7 |
| C6 | MeFBSEA/AA/A-174/HPA | 67/10/3/20 | 7.0/2.2/0.3/0.5 |

TABLE 7

| Example | GJ | TF | MO | Wine | SS | COF | BF | CO | AFC | Dye | Total |
|---|---|---|---|---|---|---|---|---|---|---|---|
| C1 | 5 | 5 | 5 | 5 | 4 | 5 | 5 | 4 | 5 | 5 | 48 |
| C2 | 2 | 1 | 1 | 2 | 0 | 1 | 1 | 1 | 2 | 1 | 12 |
| C3 | 2 | 3 | 2 | 3 | 0 | 3 | 2 | 1 | 0 | 2 | 18 |
| 1 | 1 | 0 | 1 | 1 | 0 | 0 | 0 | 0 | 0 | 1 | 4 |
| 2 | 0 | 1 | 1 | 3 | 0 | 1 | 2 | 0 | 0 | 1 | 9 |
| 3 | 0 | 1 | 1 | 2 | 0 | 1 | 1 | 0 | 1 | 1 | 8 |

TABLE 7-continued

| Example | GJ | TF | MO | Wine | SS | COF | BF | CO | AFC | Dye | Total |
|---|---|---|---|---|---|---|---|---|---|---|---|
| 4* | | | | | | | | | | | |
| 5 | 0 | 0 | 0 | 2 | 0 | 0 | 0 | 0 | 0 | 1 | 3 |
| C4 | 1 | 1 | 1 | 3 | 0 | 2 | 2 | 0 | 3 | 2 | 15 |
| C5 | 1 | 1 | 1 | 3 | 0 | 3 | 2 | 1 | 2 | 2 | 16 |
| C6 | 3 | 0 | 1 | 3 | 1 | 2 | 4 | 1 | 3 | 2 | 20 |

*polymer sample gelled and could not be applied

The stain test data is summarized in Table 7. The performance data shows that the water based polyacrylates gave good stain resistance. Most of the water based acrylates of the invention are better than the comparative examples. Several formulations, such as Ex. 1 and Ex. 5 gave excellent protection to the surface from water and oil stains. The results also show that the inclusion of HPA (Examples C4, C5 & C6; U.S. Pat. No. 6,037,429) yields poorer stain performance when compared to compositions of the invention.

TABLE 8

Stain results on limestone

| Example | GJ | TF | MO | Win | SS | COF | BF | CO | AFC | Dye | Total |
|---|---|---|---|---|---|---|---|---|---|---|---|
| 9 | 2 | 0 | 0 | 2 | 0 | 1 | 0 | 0 | 2 | 0 | 7 |
| 10 | 1 | 0 | 0 | 1 | 0 | 1 | 0 | 0 | 1 | 0 | 4 |
| 11 | 1 | 0 | 1 | 1 | 0 | 1 | 0 | 0 | 1 | 0 | 5 |
| 12 | 1 | 0 | 1 | 1 | 0 | 1 | 0 | 0 | 1 | 0 | 5 |
| 13 | 2 | 0 | 0 | 2 | 0 | 1 | 0 | 0 | 2 | 0 | 7 |
| 14 | 3 | 0 | 1 | 3 | 0 | 1 | 1 | 0 | 2 | 1 | 12 |
| 15 | 1 | 0 | 1 | 1 | 0 | 0 | 0 | 0 | 1 | 0 | 4 |
| 16 | 1 | 0 | 1 | 1 | 0 | 0 | 1 | 0 | 1 | 0 | 5 |
| 17 | 1 | 0 | 1 | 1 | 0 | 0 | 0 | 0 | 1 | 0 | 4 |
| 18 | 1 | 0 | 1 | 1 | 0 | 0 | 0 | 0 | 1 | 0 | 4 |
| 19 | 1 | 0 | 1 | 1 | 0 | 0 | 0 | 0 | 1 | 0 | 4 |
| 20* | | | | | | | | | | | |
| 21* | | | | | | | | | | | |
| 22 | 2 | 0 | 0 | 2 | 0 | 0 | 1 | 0 | 2 | 0 | 7 |
| 23 | 2 | 0 | 0 | 2 | 0 | 0 | 0 | 0 | 1 | 0 | 5 |
| 24 | 1 | 0 | 0 | 0 | 0 | 1 | 0 | 0 | 1 | 0 | 3 |
| 25 | 3 | 0 | 1 | 3 | 0 | 1 | 1 | 0 | 2 | 0 | 11 |

*polymer samples gelled and could not be applied

TABLE 9

Stain Results on limestone

| Example | GJ | TF | MO | Wine | SS | COF | BF | CO | AFC | Dye | Total |
|---|---|---|---|---|---|---|---|---|---|---|---|
| 27 | 2 | 0 | 0 | 3 | 0 | 3 | 1 | 0 | 2 | 0 | 11 |
| 28* | | | | | | | | | | | |
| 29 | 1 | 0 | 1 | 2 | 0 | 3 | 0 | 0 | 2 | 0 | 9 |
| 30* | | | | | | | | | | | |
| 31 | 1 | 1 | 1 | 2 | 0 | 0 | 3 | 0 | 2 | 0 | 10 |
| 32 | 1 | 0 | 1 | 2 | 0 | 1 | 1 | 0 | 2 | 0 | 7 |

*very low solubility in water and could not be applied.

EXAMPLES 33–36 and Comparative Example C7–C8

Limestone tile was coated with 3 wt. % of the indicated polymer at room temperature. A second coat was applied after the first coat had dried at least 12 hours, before stain testing. Four oil-based stains were placed on the coated tiles at room temperature, and heated for 5 hours at 100° C. On cooling, the excess stain material was removed and the tile cleaned as previously described. The results are shown in Table 10.

TABLE 10

| Ex | MeFBSA/AA/A-174/HPA/BA | TF | MO | BF | CO | Total score |
|---|---|---|---|---|---|---|
| 33 | 80/17/3/0/0 | 0 | 0 | 1 | 0 | 1 |
| 34 | 70/27/3/0/0 | 1 | 0 | 2 | 0 | 3 |
| 35 | 75/22/3/0/0 | 1 | 0 | 2 | 0 | 3 |
| 36 | 65/32/3/0/0 | 2 | 1 | 2 | 0 | 5 |
| C7 | 70/15/3/12/0 | 3 | 2 | 4 | 2 | 11 |
| C8 | FC-759 | 0 | 0 | 0 | 0 | 0 |

Various modifications and alterations of this invention will become apparent to those skilled in the art without departing from the scope and spirit of the present invention, and it should be understood that this invention is not to be unduly limited to the illustrative embodiments set forth hereinabove.

We claim:

1. An aqueous fluorochemical polymeric composition comprising polymers having interpolymerized units derived from one or more of each of the following monomers:

(a) monomer selected from the group consisting of acrylate, methacrylate, acrylamide, methacrylamide, thioacrylate and meththioacrylate compounds containing a fluoroaliphatic moiety that is linked to the residue of the compound through a divalent, organic linking group;

(b) monomer selected from the group consisting of acrylic acid, methacrylic acid, carboxyalkylacrylate and carboxyalkylmethacrylate compounds, (c) monomer selected from the group consisting of acrylate, methacrylate, acrylamide, methacrylamide, thioacrylate and meththioacrylate compounds containing an alkoxysilane moiety linked to the residue of the compound through a divalent organic group; and (d) optionally other monomers containing a non-hydrophilic group.

2. The composition of claim 1 wherein the polymer has a number average molecular weight between about 3500 and about 100,000 and a molecular weight distribution of greater than 1.5.

3. The polymer of claim 1 having the formula:

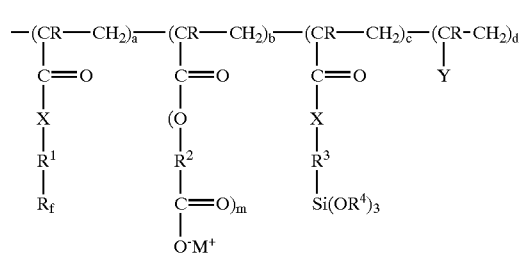

wherein:

R is hydrogen or an aliphatic group having from 1 to 4 carbon atoms;

$R_f$ is a fluoroaliphatic group having a carbon chain from 3 to 6 carbon atoms in length;

$R^1$ is an organic divalent connecting group;

X is independently selected from the group consisting of oxygen, nitrogen, or sulfur;

$R^2$ is a short chain alkylene group;

m is 0 or 1;

$M^+$ is hydrogen atom or a mono- or multivalent cation;

$R^3$ is an organic divalent connecting group;

$R^4$ is hydrogen, or a methyl, ethyl, or butyl group;

Y is a non-hydrophilic group and a, b, c are $\geq 1$ and $d \geq 0$.

4. The polymer of claim 1 having the formula:

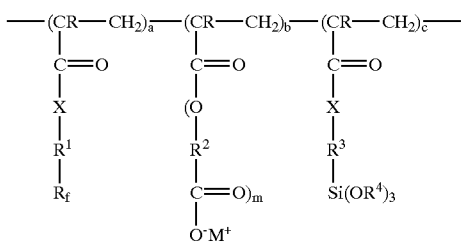

wherein:

R is hydrogen or an aliphatic group having from 1 to 4 carbon atoms;

$R_f$ is a fluoroaliphatic group having a carbon chain from 3 to 6 carbon atoms in length;

$R^1$ is an organic divalent connecting group;

X is independently selected from the group consisting of oxygen, nitrogen, or sulfur;

$R^2$ is a short chain alkylene group;

m is 0 or 1;

$M^+$ is hydrogen atom or a mono- or multivalent cation;

$R^3$ is an organic divalent connecting group;

$R^4$ is hydrogen, or a methyl, ethyl, or butyl group; and a, b, and c are $\geq 1$.

5. The composition of claim 4 wherein:

$R^1$ is selected from the group consisting of —$C_yH_{2y}$—, —$CON(R^5)C_yH_{2y}$—, —$SO_2N(R^5)C_yH_{2y}$—, and —$C_yH_{2y}SO_2N(R^5)C_yH_{2y}$—, where $R^5$ is hydrogen, or a methyl, ethyl, propyl, or butyl group and y is independently selected as between 1 and 6 inclusive; and $R^2$ and $R^3$ are each independently is a methylene, ethylene, propylene, or butylene group.

6. The composition of claim 5 wherein the polymer has a number average molecular weight between about 3500 and about 100,000 and a molecular weight distribution of greater than 1.5.

7. The polymer of claim 1, containing only carbon atoms in the backbone, consisting essentially of interpolymerized units of (a) 40 to 80 weight percent of monomers containing fluoroaliphatic groups, (b) 5 to 50 weight percent of monomers containing carboxyl groups, (c) 1 to 20 weight percent of monomers containing silyl groups and (d) 0 to 20 weight percent of other monomers having a non-hydrophilic group.

8. The polymer of claim 1 wherein said monomers containing fluoroaliphatic groups comprise 50 to 80 percent by weight, the monomers containing carboxyl groups comprise 5 to 25 percent by weight, the monomers containing silyl groups comprise 2 to 15 percent by weight, of said polymer and 0 to 5 percent by weight of monomers containing a non-hydrophilic group.

9. A shelf-stable aqueous solution comprising the composition of claim 1.

10. The polymer of claim 4, wherein said $R_f$ group is perfluorinated.

11. The polymer of claim 1 wherein said monomers (d) are selected from the group consisting of (meth)acylate esters and amides, vinyl ethers, vinyl esters, and styrenes.

12. The polymer of claim 11 wherein said monomers (d) are selected from $C_1$–$C_{13}$ alkyl (meth)acrylate esters and amides; $C_1$–$C_{18}$ alkyl vinyl ethers; and $C_1$–$C_{18}$ alkyl vinyl esters.

13. A method for rendering a porous substrate repellent to water and/or oil-based stains comprising applying to the substrate the composition of claim 1, allowing the composition to penetrate the surface of the article, and allowing the composition to cure on the substrate surface.

14. The method of claim 13 wherein the substrate is cured at ambient temperatures.

15. The method of claim 13 wherein the substrate is selected from the group consisting of masonry, concrete, asphalt, wellbores, textiles, carpets, plastics, painted surfaces, and leathers.

16. A method for treating a wellbore comprising the steps of: injecting the composition of claim 1 into the wellbore for a time and at a pressure sufficient to allow the composition to flow into the porous wellbore substrate and reduce the surface energy of the porous wellbore substrate.

17. A porous substrate treated with the composition of claim 1.

18. A porous substrate treated by the method of claim 13.

* * * * *

UNITED STATES PATENT AND TRADEMARK OFFICE
CERTIFICATE OF CORRECTION

PATENT NO. : 6,689,854 B2
DATED : February 10, 2004
INVENTOR(S) : Fan et al.

It is certified that error appears in the above-identified patent and that said Letters Patent is hereby corrected as shown below:

Title page,
Item [56], References Cited, OTHER PUBLICATIONS,
"Guo-Qing Tang." reference, delete "Search" and insert -- Research --.

Column 3,
Line 28, delete "Bemett" and insert -- Bernett --.
Line 40, after "Chem" insert -- , --.

Column 7,
Line 11, delete "2,2" and insert -- 2,2' --.
Lines 16-17, delete "isooctyithioglycolate" and insert -- isooctylthioglycolate --.

Column 9,
Line 33, delete "Veryflne" and insert -- Veryfine --.

Columns 9/10,
Col. 2, Row 3, Table 1, delete "$C_4F_9SO_2N(CHhd 3)CH_2CH_2OH$" and insert
-- $C_4F_9SO_2N(CH_3)CH_2CH_2OH$ --.

Column 12,
Line 11, delete "Example" and insert -- Examples --.

Column 14,
Line 35, after "compounds" delete "," and insert -- ; --.

Column 16,
Line 24, delete "$C_1-C_{13}$" and insert -- $C_1-C_{18}$ --.

Signed and Sealed this

Twenty-eighth Day of February, 2006

JON W. DUDAS
*Director of the United States Patent and Trademark Office*